United States Patent
Ackermann et al.

(10) Patent No.: US 9,991,573 B2
(45) Date of Patent: Jun. 5, 2018

(54) HOUSING DEVICE FOR AT LEAST ONE ENERGY STORE CELL AND METHOD FOR PRODUCING AN HOUSING DEVICE FOR AT LEAST ONE ENERGY STORE CELL

(71) Applicant: Robert Bosch GmbH, Stuttgart (DE)

(72) Inventors: Jens Ackermann, Stuttgart (DE); Veronika Vogel, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 565 days.

(21) Appl. No.: 14/299,393

(22) Filed: Jun. 9, 2014

(65) Prior Publication Data

US 2014/0363720 A1    Dec. 11, 2014

(30) Foreign Application Priority Data

Jun. 17, 2013 (DE) ........................ 10 2013 210 585

(51) Int. Cl.
| | |
|---|---|
| *H01M 10/6557* | (2014.01) |
| *H01M 10/613* | (2014.01) |
| *H01M 10/647* | (2014.01) |
| *H01M 10/625* | (2014.01) |
| *H01M 10/6556* | (2014.01) |
| *H01M 2/10* | (2006.01) |

(52) U.S. Cl.
CPC ..... *H01M 10/6556* (2015.04); *H01M 2/1077* (2013.01); *H01M 10/613* (2015.04); *H01M 10/625* (2015.04); *H01M 10/647* (2015.04); *H01M 10/6557* (2015.04); *H01M 2220/20* (2013.01); *Y10T 29/49108* (2015.01)

(58) Field of Classification Search
CPC .......... H01M 10/6557; H01M 10/613; H01M 10/647; H01M 10/625; H01M 2/1077; Y10T 29/49108
See application file for complete search history.

(56) References Cited

U.S. PATENT DOCUMENTS

| | | | | |
|---|---|---|---|---|
| 5,756,227 | A * | 5/1998 | Suzuki | ...................... F28F 3/02 |
| | | | | 429/120 |
| 2005/0058891 | A1 | 3/2005 | Marraffa | |
| 2011/0244298 | A1* | 10/2011 | Guener | ............... H01M 2/1061 |
| | | | | 429/120 |
| 2011/0262794 | A1* | 10/2011 | Yoon | ................... H01M 10/486 |
| | | | | 429/120 |
| 2011/0274956 | A1* | 11/2011 | Lin | ..................... H01M 2/1077 |
| | | | | 429/99 |
| 2013/0034755 | A1 | 2/2013 | Kim | |

(Continued)

FOREIGN PATENT DOCUMENTS

| | | |
|---|---|---|
| DE | 10 2008 057210 | 5/2010 |
| DE | 10 2009 005124 | 7/2010 |

(Continued)

*Primary Examiner* — Eugenia Wang
(74) *Attorney, Agent, or Firm* — Norton Rose Fulbright US LLP

(57) ABSTRACT

A housing device for at least one energy store cell is described. The housing device includes an housing element for accommodating the energy store cell, the housing element having a back wall and at least two side walls lying opposite to each other. Furthermore, a front side of the housing element, lying opposite the back wall, is open, and is closable by a further back wall of an additional housing element.

16 Claims, 7 Drawing Sheets

(56) References Cited

U.S. PATENT DOCUMENTS

| | | | | |
|---|---|---|---|---|
| 2013/0224524 A1* | 8/2013 | Nam | .................. | H01M 2/1077 |
| | | | | 429/7 |
| 2013/0309543 A1* | 11/2013 | Kim | .................. | H01M 10/625 |
| | | | | 429/120 |
| 2014/0335390 A1* | 11/2014 | Hwang | ............. | H01M 10/5075 |
| | | | | 429/72 |

FOREIGN PATENT DOCUMENTS

| | | | | |
|---|---|---|---|---|
| DE | 10 2009 013346 | | 9/2010 | |
| DE | 10 2010 013002 | | 9/2011 | |
| DE | 10 2012 200617 | | 7/2013 | |
| EP | 2 325 937 | | 5/2011 | |
| WO | 2010/061063 | | 6/2010 | |
| WO | WO-2012102496 A2 * | | 8/2012 | .......... B60L 11/1864 |
| WO | WO 2013/081396 A1 * | | 6/2013 | |

* cited by examiner

HOUSING DEVICE FOR AT LEAST ONE ENERGY STORE CELL AND METHOD FOR PRODUCING AN HOUSING DEVICE FOR AT LEAST ONE ENERGY STORE CELL

RELATED APPLICATION INFORMATION

The present application claims priority to and the benefit of German patent application no. 10 2013 210 585.1, which was filed in Germany on Jun. 7, 2013, the disclosure of which is incorporated herein by reference.

FIELD OF THE INVENTION

The present invention relates to an housing device for at least one energy store cell, to an energy store device, to a connecting piece for an housing element for an energy store device as well as to a method for producing an housing device for at least one energy store cell.

BACKGROUND INFORMATION

An energy store cell, for instance, a prismatic lithium ion battery cell for electric vehicles is situated in an housing device, such as a battery module housing. Conventional battery module housings for prismatic lithium ion battery cells are made principally of welded sheet metal. This construction of sheet metal may result in a large mass of the battery module housing. The mass of a battery peripherals made up, for instance, of a high voltage connection system, a cooling system, an electronics system, an housing and a charging system should, however, be kept as low as possible, since, based on a battery system, the mass of an electric vehicle may be higher anyway than the mass of a vehicle having conventional drive, and codetermines the capacity of the battery system.

German document DE 10 2009 013 346 A1 discusses a conventional housing device for at least one energy store cell.

SUMMARY OF THE INVENTION

With this as background, the present invention provides an improved housing device for at least one energy store cell, an improved energy store device, an improved connecting piece for an housing element for an energy store device, as well as an improved method for producing such an housing device according to the main claims. Advantageous refinements are derived from the respective dependent claims and the following description.

An housing device for an energy store cell may be provided as a modular enclosure. In this context, each housing element is able to accommodate one energy store cell. Such an housing element is able to assume the function of insulating the cell both thermally and electrically, supporting it mechanically and sealing it from media. In this context, a next housing element may respectively close off the previous one with a back wall, so that a sealed enclosure is created.

Presently, an housing device is provided for at least one energy store cell, the housing device having the following feature:

an housing element for accommodating the energy store cell, the housing element having a back wall and at least two side walls lying opposite to each other, a front side of the housing element lying opposite the back wall being open, and being able to be closed by an additional back wall of a further housing element.

By an housing device one may understand a modularly configured housing for accommodating one or more energy store cells. Such an housing device may be used in electric vehicles, for example.

By an energy store cell one may generally understand a galvanic cell for storing electrical energy. Such an energy store cell may be implemented, for instance, in the form of a battery, especially a prismatic lithium ion battery cell or an accumulator.

By an housing element one may understand a single enclosure for accommodating a single energy store cell. The housing element may be made as a plastic half shell, for example. The housing device may include a plurality of such housing elements, a back wall of the housing element being able to close tightly an open front side of the preceding housing element. The energy store cell may thus be insulated electrically and protected from environmental effects.

The housing device may be provided with at least one guide element that is situated or is able to be situated on the housing element, the guide element being able to have a through hole for passing through a connecting element. By a guide element having a through hole one may understand, for example, a plastic sleeve or a metal sleeve developed on the housing element. A connecting element may be configured as a metallic connecting rod or tie rod, for example. The connecting element may be screwed to a nut, at least at one end, against the guide element. Using the guide element and the connecting element, a specified force may be exerted on the housing device, in order to brace the housing device.

According to one specific embodiment of the present approach, the housing device may be configured with the connecting element, and this may be passed through the through hole to brace the housing device. The housing device thus braced simplifies the subsequent mounting and makes the housing device particularly stable.

Moreover, the housing element may be made of plastic. Such an housing element is especially cost-effective to produce.

The housing device may be provided with at least one cooling channel, for conveying the cooling fluid through the housing element, for cooling the energy store cell, the cooling channel having an interface for connecting the cooling channel to a cooling system. By a cooling channel one may understand a channel for conveying a cooling fluid. The cooling channel may be integrated into a side wall of the housing element. Alternatively, the cooling channel may also run all the way around the energy store cell. By an interface of the cooling channel one may understand a connection of the cooling channel to the cooling system, for example. Such a connection may be developed as a plug connection, for instance, to the lower side of the side wall of the housing element. A cooling system may be implemented in the form of a cooling plate, for example, which is situated under the housing device and which is able to be connected to the interface of the cooling channel by being plugged together, for instance. Because of the cooling channel, a constant temperature of the energy store cell may be ensured.

The housing device may have a bottom wall which closes a lower side of the housing element, an upper side of the housing element, lying opposite the bottom wall, being open and being able to be closed by a cover element. Using the bottom wall and the cover element, the energy store cell situated in the housing element may be completely enclosed and sealed by the additional back wall of the additional housing element.

The housing device may be carried out together with the cover element, the cover element closing the upper side of the housing element. Because of the cover element, which may have cutouts, for example, for contact locations of the energy store cell, an interference-free contacting of the energy store cell may take place.

The cover element may be able to be connected to an additional cover element for closing an additional upper side of the additional housing element. The housing device is able to be additionally stabilized thereby.

The housing device may have the additional housing element for accommodating a further energy store cell. The additional housing element may have the additional back wall and at least two additional side walls lying opposite to each other. In this context, an additional front side of the additional housing element lying opposite to the additional back wall may be open. The front side of the housing element may be closed by the additional back wall of the additional housing element. By such an arrangement, housing devices may be implemented which differ in the number of energy store cells, but are each built up of the same housing elements. Thereby, components and material costs may be saved. For example, two, three or more housing elements may be mounted side-by-side, the front side of one housing element being able to be closed in each case by the back wall of the adjacent housing element.

The housing device may be provided with an end plate for closing the additional front side of the additional housing element lying opposite to the additional back wall, or of yet another housing element. In this context, the end plate may have at least one end plate opening for passing through the connecting element. If the housing device has more than two housing elements that are joined to each other, the end plate may close off the front side of the last housing element that was joined on. Using such an end plate, the housing device may be sealed, fixed and braced.

The present approach also creates an energy store device having the following features:
  an housing device; and
  at least one energy store cell which is able to be accommodated by the at least one housing element of the housing device.

By an energy store device one may generally understand a device for providing electrical energy. The energy store device may be used, for instance, to supply an electric vehicle with electrical energy. The electrical energy may be provided over a longer time period using the energy store device.

Furthermore, the present approach provides a connecting piece for an housing element for an energy store device, the connecting piece being situated or able to be situated in an inner region of an housing element for accommodating an energy store cell. In this connection, the connecting piece may have a through hole channel for conveying a fluid from a first end to a second end of the connecting piece. Furthermore, the second end may have an interface for the fluid-tight connection of the connecting piece to an additional first end of an additional connecting piece. The connecting piece may be implemented, for instance, in the form of a conventional hose connector having two opposite connections, a connection of the hose connector being able to be connected in a fluid-tight manner to a further connection of an additional hose connector. One may take the term fluid to mean a cooling fluid, for instance. Using the connecting piece and the cooling fluid that is able to be conveyed by the connecting piece, a temperature of the energy store device is able to be held constant.

Finally, the present approach creates a method for producing an energy store device, the method being able to include the following steps:
  providing an housing element for accommodating an energy store cell, the housing element having a back wall and at least two side walls lying opposite to each other, a front side of the housing element lying opposite the back wall being able to be open, and being able to be closed by an additional back wall of a further housing element;
  mounting the energy store cell in the housing element;
  connecting the housing element to the additional housing element for accommodating a further energy store cell, the additional housing element being able to have the additional back wall and at least two additional side walls lying opposite to each other; one of the additional front side of the additional housing element lying opposite the additional back wall being able to be open; the front side of the housing element being able to be closed by the additional back wall of the additional housing element;
  mounting the additional energy store cell in the additional housing element; and
  closing the additional front side or yet another front side of yet another housing element by an end plate.

In the following text, the present invention will be explained in greater detail by way of example with reference to the attached drawings.

DETAILED DESCRIPTION

Figure 1:
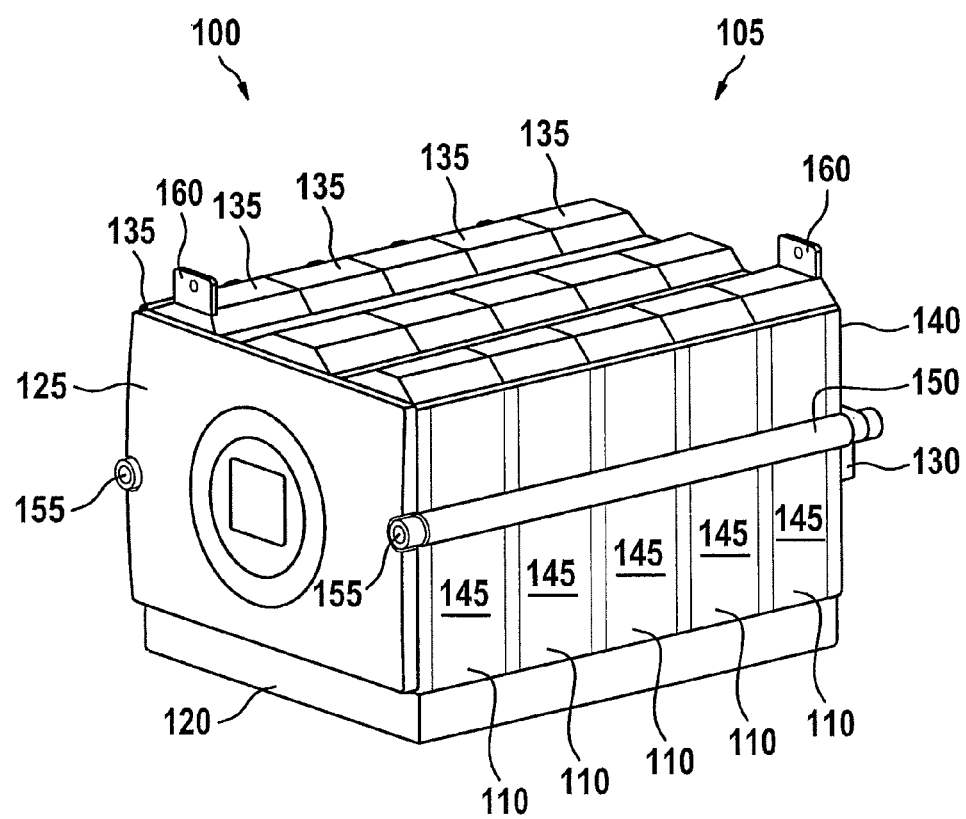
FIG. 1 shows a schematic illustration of an energy store device according to an exemplary embodiment of the present invention.

In the subsequent description of favorable exemplary embodiments of the present invention, the same or similar reference numerals are used for the elements that are shown in the various figures and act similarly, a repeated description of these elements having been dispensed with.

Figure 2:
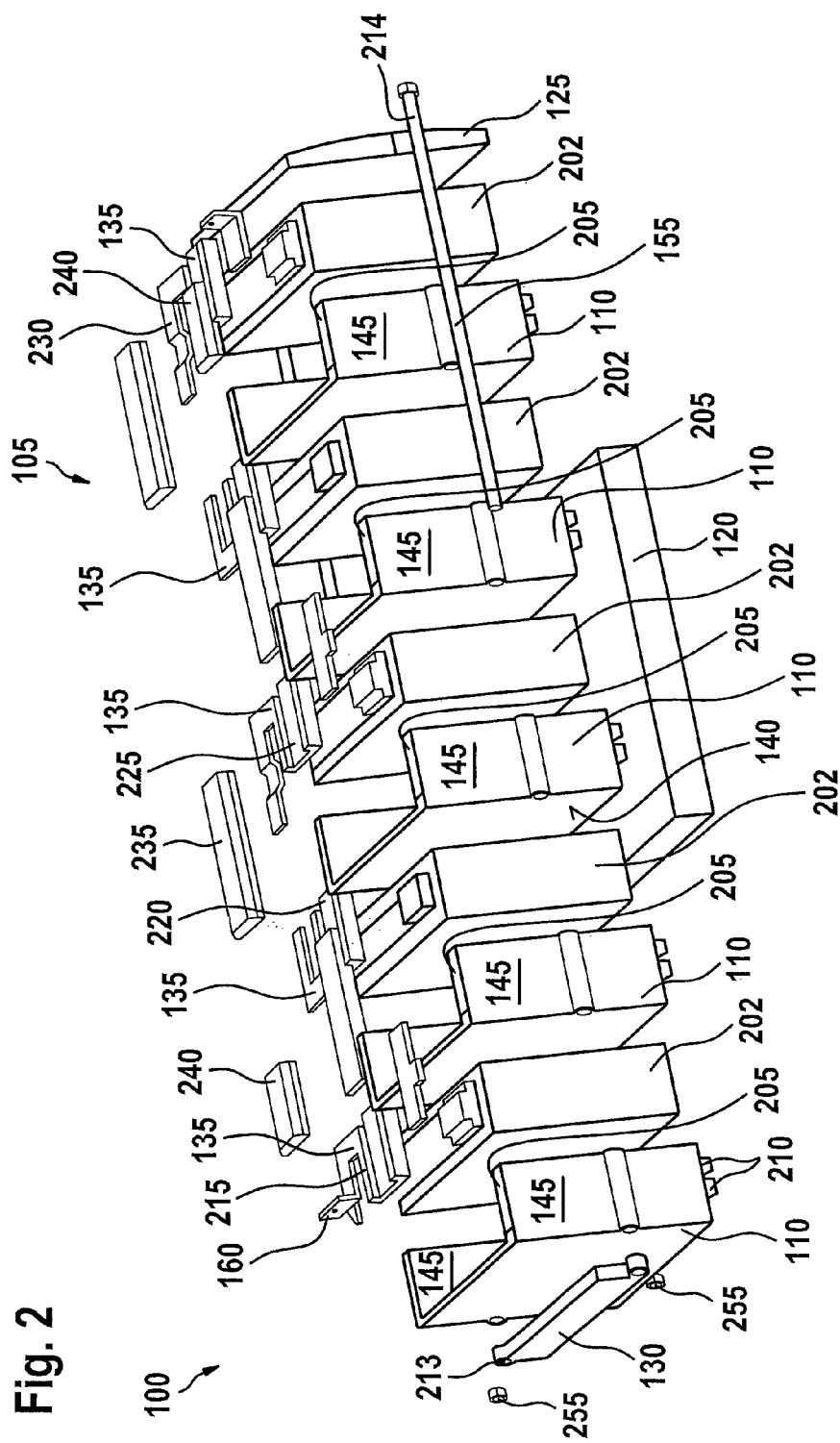
FIG. 2 shows a schematic illustration of an energy store device according to an exemplary embodiment of the present invention.

FIG. 1 shows an energy store device 100 in the assembled state, according to an exemplary embodiment of the present invention. Such an energy store device 100 may also be designated as a battery system, a battery module or a module. Energy store device 100 includes an housing device 105, that is also called a modular enclosure for energy store cells, battery enclosure or battery module enclosure. According to this exemplary embodiment, housing device 105 has five housing elements 110, for example, in each of which one energy store cell is situated, as shown in FIG. 2. Furthermore, housing device 105 has a cooling device 120, an end plate 125, that is also called an end face plate, as well as a reinforcing element 130, which is shown only partially in FIG. 1, and is also called an optional connecting component. The five housing elements 110 are additionally provided each with one cover element 135.

Energy store device 100 has the form of a modularly configured parallelepiped block, which is formed by housing elements 110 that are mounted side-by-side along a longitudinal axis of energy store device 100. A lower side of energy store device 100 is formed by cooling device 120, which is configured, for instance, in the form of a rectangular cooling plate. Cooling device 120 is provided to ensure a constant temperature of the energy store cells. An upper side of energy store device 100 lying opposite the lower side of energy store device 100 is formed by cover elements 135, which respectively close housing elements 110, each cover element 135 being adjacent to an additional cover element 135 that borders it in a flush manner.

Reinforcing element 130 is situated at a first end of energy store device 100, and spans and reinforces a back wall 140 of one of two outer lying ones of housing elements 110. End plate 125 is situated at one end of energy store device 100 lying opposite to the first end. The end plate is developed to close the front side of the other of the two outer lying housing elements 110.

Each of housing elements 110 has two opposite side walls 145 (in FIG. 1 only one side is visible). Side walls 145 are each provided with one guide element 150 (of which only one is provided with a reference numeral), also named guidance, for carrying out a connecting element 155. Guide elements 150 are executed, for instance, in the form of a sleeve, a through hole of guide element 150 shown in FIG. 4 being situated in parallel with the longitudinal axis of energy store device 100. Connecting element 155 is implemented as a metallic connecting rod or tie rod, for example. Guide elements 150 of the individual housing elements 110, that are mounted side-by-side, form a channel on one side each of energy store device 100, running in parallel with the longitudinal axis of energy store device 100, for passing through connecting element 155. Connecting element 155 is passed through end plate 125, five guide elements 150 and reinforcing element 130, the end of connecting element 155 being screwed together with a nut, for example. Housing device 105 is thereby firmly braced. Because of reinforcing element 130, the buckling of back wall 140 during bracing is prevented.

In one corner region of energy store device 100 and lying diametrically opposite to each other, the two outer cover elements each have respectively one slot-shaped opening, through which an angular contacting element 160 is guided, for picking off an electric current foe example, or for linking energy store device 100 to an additional energy store device 100. Angular contacting element 160 is configured, for example, as a metal platelet bent at right angles, for accommodating a plug connector, for example.

Energy store device 100 may accommodate lithium ion cells or nickel metal hydride cells, for instance, and be situated in an electric vehicle or a hybrid vehicle, to supply an electric motor with power.

According to one specific embodiment, housing device 105 is configured as a battery module housing and the energy store cells are configured as lithium ion cells. Battery module housing 105 has various objectives: It is supposed to fix the lithium ion cells during an assembly process and ensure the required bracing of the cells for the flawless functioning of energy store device 100, in this case in the form of a battery system. Beyond that, battery module housing 105 is supposed to prevent the penetration of media from the outside, such as salt water, but also the escaping of reaction products of the lithium ion cells in the case of damage. In order to ensure an optimum operating temperature of the lithium ion cells, battery module housing 105 is able to be co-responsible for a tempering of the cells, in addition to an actual tempering system. Apart from contacting connectors at the cell terminals, the lithium ion cells are to be electrically insulated. If housing part 110 is produced of an electrically insulating material, such as a plastic, one may, for instance, do without a manual lacquering of the metallic cell can that has been done up to now. Thereby the expenditure for fulfilling safety regulations and environmental protection regulations may be reduced, and long lacquering and drying processes are avoidable, which could also result in a fluctuation of cell dimensions, which might, in turn, lead to problems in a subsequent assembly. The deep-drawn, prismatic cell cans actually already ensure a certain mechanical stability, but battery module housing 105 also is supposed to increase the mechanical stability of battery system 100 in the case of a crash.

Because of energy store device 100, battery modules may be implemented having a different number of cells. Therefore it is not necessary to provide for each module size its own enclosure of sheet metal. Thereby the multiplicity of parts may be reduced, and a low number of variants and a small proportion of manual labor in the assembly may be achieved, which, in turn, may result in cost-effective sub-assemblies and a low logistics effort.

It is also not required to implement cell insulation having (deepdrawn) foils. Because of that, there is no limitation caused by draft angles that are required in the case of such foils, which are not possible for all cell sizes. In addition, good thermal contacts are able to be created by the approach described.

In order to be able to ensure the safe operation of prismatic lithium ion battery cells for electric vehicles, the cells may be braced within a module 100. This is able to take place using connecting elements 155. For bracing the cells, one may therefore dispense with stringing the cells together with the aid of a steel band or bracing them using a frame made of sheet metals. Thereby one is able to brace the cells in a simple manner using a specified prestressing force. In addition, one may dispense with costly devices for fixing the cells during a bracing process. Nevertheless, an exact alignment of the cells may be ensured by housing elements 110.

FIG. 2 shows an exploded representation of energy store device 100, shown in FIG. 1, according to an exemplary embodiment of the present invention. An energy store cell 202 is situated in each case between two adjacent housing elements 110. One form of energy store cell 202 corresponds essentially to an inner shape of housing element 110, so that energy store cell 202 is able to be completely accommodated by housing element 110. In this instance, the open front side of an housing element 110 may respectively be closed by a further back wall 140 of a further housing element 110.

On an upper side of energy store cells 202 facing cover elements 135, in each case a plus pole and a minus pole are developed, the poles being situated in each case in an outer edge region of energy store cells 202, that is adjacent to side walls 145. Two energy store cells 202 situated adjacently are situated with respect to each other in such a way that the plus or minus pole of energy store cells 202 has in each case a minus or plus pole of the other energy store cells 202 lying opposite to it, so that the two energy store cells 202 are able to be connected in series in a simple manner.

A side wall 145 of housing elements 110 is in each case provided with a cooling channel 205. Furthermore, the lower sides of side walls 145 that are provided with the cooling channels 205 each have an interface 210 (only the side wall of housing element 110 shown on the left is provided with appropriate reference numerals) for connecting cooling channels 205 to cooling device 120. Interface 210 is implemented, for instance, in the form of a two-part plug connection for supplying or removing a cooling fluid, cooling device 120 having corresponding depressions for accommodating the five plug connections. The upper sides of side walls 145, having the cooling channels 205, lying opposite to the lower sides are each closable by cover elements 135. Cooling channels 205 may thus extend over the entire length of side walls 145, between the upper side and the lower side.

Reinforcing element 130 is configured as a rectangular (plastic) plate and has reinforcing element openings 213 lying opposite to each other, which are each developed as an eyelet projecting outwards laterally beyond reinforcing element 130. In this context, a horizontal distance of reinforcing element openings 213 corresponds to a horizontal distance of feed-through openings 403 (not visible) that lie opposite to each other.

Connecting element 155 is configured as a connecting rod, a length of connecting element 155 corresponding to a length of energy store device 100. Connecting element 155 has a bolt at its first end and a thread at its second end for screwing on a nut 255, so that housing device 105 is able to be braced.

Connecting element 155 is able to be guided through an end plate opening 214, the bolt lying on end plate 125.

The length and the width of cover element 135 correspond to a length and a width of the upper side of housing element 110. In this context, cover element 135 has an s-shaped form having a first and a second cover cutout, the first and the second cover cutout each representing an opening of the S. The first and the second cover cutout are developed to accommodate respectively the minus and the plus pole of energy store cell 202. Cover element 135 may be produced in an injection molding method, for example, from a pressed screen.

In the middle of cover elements 135, a cover elevation 215 is developed in each case. A first end of one of cover elevations 215, that faces the front side of housing element 110, is developed as cover connecting element 220, a diameter of cover connecting element 220 being, for instance, 10 to 20 percent less than a diameter of cover elevation 215. A second end of cover elevation 215, facing back wall 140 of housing element 110 has a cover cutout 225, a diameter of cover cutout 225 corresponding to the diameter of cover connecting element 220. Consequently, cover connecting element 220 of cover element 135 is able to be plugged together with a further cover cutout 225 of the further cover element 135 to form a modularly configured cover of energy store device 100.

Two cover elements 135 situated adjacently are situated in mirror image form to each other, so that the first cover cutout of a first cover element 135 and a further second cover cutout of an adjacently situated further cover element 135 face each other, and the second cover cutout of the first cover element 135 and a further first cover cutout of the further cover element 135 face away from each other.

The minus poles and the plus poles of the respective energy store cells 202, situated in the first and second cover cutouts, lying opposite to each other may be contacted pairwise using a planar contacting element 230, that is also called a cell connector. Planar contacting element 230 has a lowered region between the contact surfaces for the minus pole and the plus pole, so that flat contacting element 230 is able to be positioned between the minus pole and the plus pole without sliding out of place.

Flat contacting element 230 may be covered by a long cover cap 235, the long cover cap 235 being twice as long as cover elevation 215. Moreover, angular contacting element 160 may be covered by a short cover cap 240, the short cover cap 240 being as long as cover elevation 215. In order to mark whether short cover cap 240 is covering a minus pole or a plus pole, short cover cap 240 may be color-coded appropriately.

Figure 3:
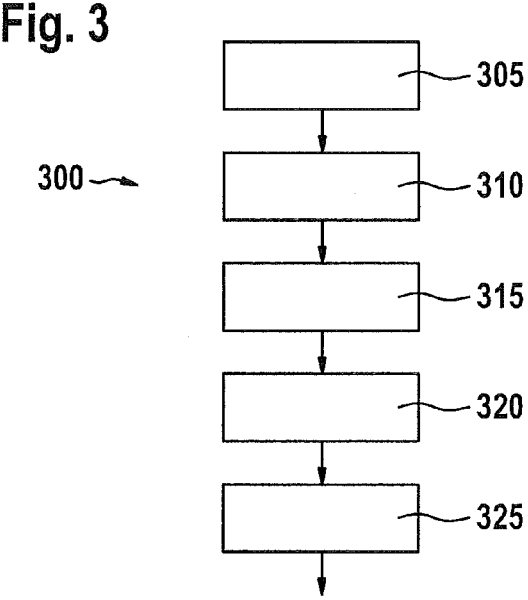
FIG. 3 shows a flow chart of a method for manufacturing an energy store device according to an exemplary embodiment of the present invention.

FIG. 3 shows a method 300 for producing an energy store device as is shown, for example, in FIGS. 1 and 2, according to an exemplary embodiment of the present invention.

First of all, there is a step 305 of providing an housing element for accommodating an energy store cell, the housing element having a back wall and at least two side walls lying opposite to each other, a front side of the housing element lying opposite the back wall being open, and being able to be closed by an additional back wall of a further housing element.

In a further step 310, the mounting of the energy store cell into the housing element takes place.

Subsequently, there is a step 315 of connecting the housing element to an additional housing element for accommodating a further energy store cell, the additional housing element having the additional back wall and at least two additional side walls lying opposite to each other; one of the additional front sides of the additional housing element, lying opposite the additional back wall, being open; the front side of the housing element being closed by the additional back wall of the additional housing element.

In a step 320, the mounting of the additional energy store cell into the further housing element takes place.

Finally, in a step 325, the closing of the additional front side by an end plate takes place.

Steps 315, 320 may be carried out several times, before the front side of the last joined-on housing element is finally closed in step 325 of closing by the end plate.

Figure 4:
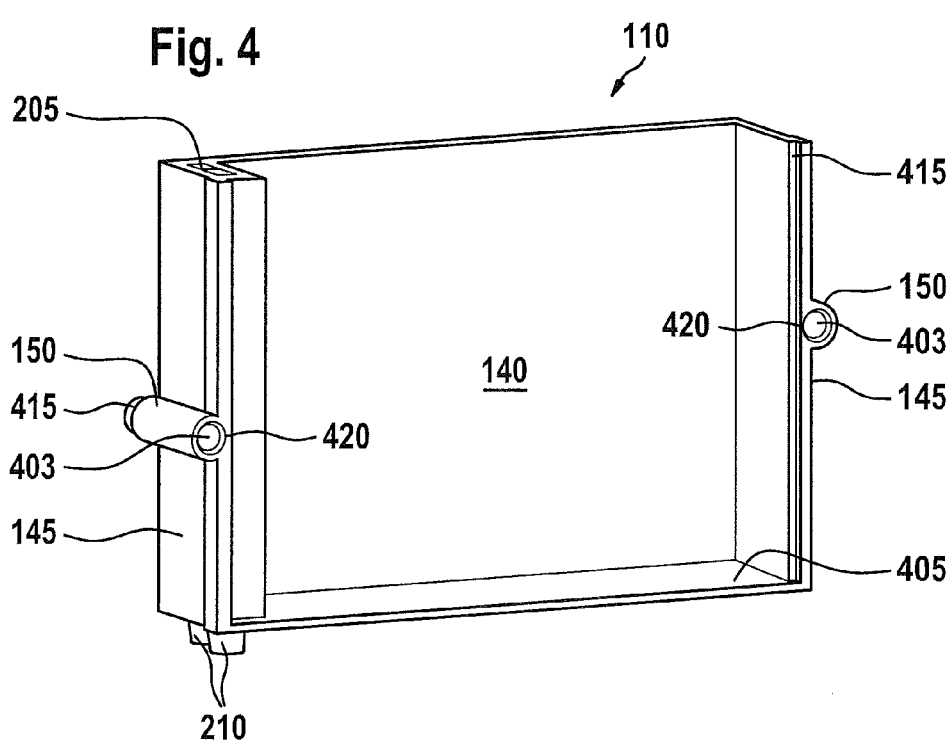
FIG. 4 shows a schematic representation of an housing element for at least one energy store cell according to an exemplary embodiment of the present invention.

FIG. 4 shows an housing element 110 of the energy store device, shown in FIGS. 1 and 2, according to an exemplary embodiment of the present invention. Housing element 110 is shaped to accommodate an, in particular, prismatic energy store cell (not shown). Housing element 110 is implemented as a half shell, housing element 110 having back wall 140 and the two side walls 145 lying opposite to each other. Furthermore, the front side lying opposite back wall 140 is open, and is able to be closed by a further back wall of a bordering, additional housing element (not shown). The lower side of housing element 110 is closed by a bottom wall 405.

An end face of side walls 145 and bottom wall 405 facing the front side is provided with an encircling groove as sealing seat 415 for accommodating the additional back wall 140 of the further housing element 110, so that housing element 110 together with further back wall 140 forms a sealed enclosure for energy store cell 202.

For the better bracing of the housing device, the one guide element 150 is offset vertically with respect to the other guide element 150, so that the force acting on housing element 110 during the bracing is distributed as uniformly as possible along a vertical axis of housing element 110. Guide element 150 also has a first guide element end 415 and a second guide element end 420. An outside diameter of first guide element 415 corresponds, in this case, to an inside diameter of second guide element end 420, the outside and inside diameters being, for instance, 10 to 20 percent larger than a diameter of through hole 403. Consequently, first guide element end 415 may be plugged together with an additional second guide element end 420 of additional housing element 110 to form the modular channel, shown in FIG. 1, for passing through connecting element 155.

Cooling channel 205 is integrated into the one side wall 145. In this context, the thickness of the cavity formed through side wall 145 corresponds, for example, to the thickness of cooling channel 205.

An housing device 105, built up of a plurality of housing elements 110 shown in FIG. 4 may be used, for instance, to substitute a metallic enclosure of a battery module by a modular construction kit concept of plastic, so that various module sizes, i.e. modules having a different number of cells, are able to be built up by using fewer standardized components. Because of this modular configuration concept, besides the number of parts and the multiplicity of parts, the costs and the weight of the enclosure of the battery module may simultaneously be reduced.

In the following, with the aid of FIG. 1 through 4, the configuration of an energy store device 100 is described, according to an exemplary embodiment of the present invention.

The exemplary embodiment is a construction kit system for an enclosure 105 of a battery system 100 made of plastic, which may be constructed for any desired number of cells per battery module 100, by plugging together individual components of the same kind.

The crux of the present invention is a half shell 110 (see FIG. 4), which in each case accommodates a single cell 202, and which may be produced by an injection molding method or a plain molding method. This half shell 110 assumes the functions of insulating cell 202 both thermally and electrically, supporting it mechanically and sealing it from media, and may also include a tempering system 120. In this context, a next half shell 110 in each case closes off a preceding half shell 110 using a back wall 140, so that a sealed enclosure 105 is created. The sealing of the half shells 110 may be ensured either by a sprayed-on sealing lip 415 or by a form locking or continuous-material locking, such as adhesion or welding. Only the last half shell 110 should be closed using a front plate 125.

Enclosure 105 according to the present concept differs for battery modules 100 having different numbers of cells only in the number of plastic components required, but not in their shape. Only a few different components are required so that all module sizes and packing sizes may be reproduced, which is able to result in a clear reduction in component and assembly costs. These plastic components are a half shell 110, a cover element 135, a front plate 125 and a connecting component 130 that may possibly be required. The present construction kit concept of plastic components also makes possible a clear reduction in the weight of battery module enclosure 105.

FIG. 1 shows module 100 according to an exemplary embodiment of the present invention having five lithium ion cells 202 in the assembled state. FIG. 2 shows the same module 100 in an exploded representation of the individual components. Depending on the number of cells required, module 100 is built up by plugging together the individual half shells 110, and is braced with the aid of two connecting rods 155 and end plate 125, the length of connecting rods 155 varies depending on the number of cells 202 per module 100. Because each cell 202 is completely surrounded by a plastic half shell 110, a conventional lacquering process for insulating cells 202 is able to be omitted. Each half shell 110 is closed using a cover 135, which already includes cell connectors 230. Cover 135 may also be constructed in a modular manner, as shown in FIG. 2. Cover caps 235, 240 prevent the cell connectors from being touched unintentionally after a contacting.

According to the exemplary embodiment shown in FIG. 4, half shell 110 already includes lateral cooling channels 205, which are connected by being plugged together with a cooling plate 120. The closing of cooling channel 205 takes place via cover 135. Half shell 110 may be embodied, for example, as a plastic-plastic hybrid component. For this purpose, an already impregnated and consolidated web semifinished product having a thermoplastic matrix (organic sheet) may be reshaped when closing an injection molding tool and may be subsequently extrusion-coated or sprayed. In this instance, large piece numbers are possible at favorable prices at a clear weight reduction at the same time, in comparison with a current metal enclosure. In the style of demonstrator components from the automotive field, one may select, for example, a balanced web of glass fiber rovings having a twill weave and a matrix of polyamide 6 or polypropylene. This has particular advantages with regard to resistance to media. This web may be extrusion-coated using the same matrix material which is glass fiber-reinforced, having glass fiber proportion of 30 volume-%. Depending on the magnitude of the forces acting as a result of bracing, the sprayed guidances 150 for connecting rods 155 should be reinforced using a metallic sleeve.

Thus, the first off-tool half shell 110 may already include cooling channels 205 and connections 210 to cooling plate 120, and take over the electrical insulation of cells 202, fix cells 202 and connect them during assembly, and contribute to the necessary bracing of cells 202. By the extrusion-coating, for example, of pressed screens or the subsequent application of printed circuit-board conductors by patterning methods, cover 135 is able to include all required signal lines. Furthermore, cover 135 is able to build up a degassing system for removing gaseous reaction products of cells 202. By extrusion-coating cell connectors 230, a corresponding assembly step may also be eliminated.

In the same way as half shell 110, end plate 125 may also be produced as a plastic-plastic hybrid component. For better force introduction, metal sleeves are provided in guidances 150 for guide rods 155. The packet of half shells 110, cells 202 and end plate 125 is braced with the aid of two connecting rods 155 and nuts. Additional connecting component 130 (cf. FIG. 2) is possibly required to prevent the buckling of an outermost half shell 110.

The braced packet of half shells 110 and cells 202 is subsequently closed using covers 135, at whose production cell connectors 230 and a pressed screen for signal transmission may already be extrusion-coated. Small fixing pins are used for fixing cover 135 on half shell 110. After the fixing of cover 135, the contacting of cells 202 takes place, and subsequently cover 135 and half shells 110 are welded together. This cover 135 may be produced as a simple injection-molded part. Since the force for the prestressing of cells 202 is conveyed via connecting rods 155 and half shells 110, no reinforcement is necessary for cover 135, such as using inlays or organic sheets. Perhaps even a non-reinforced material is conceivable. Because of the omission of inlays and reinforcing material, component part costs may be lowered additionally. Because of the injection-molding of cell connectors 230 and pressed screens, the signal transmission and a first step for cell contacting may be integrated already during the injection-molding.

Based on the two-way contacting of cells 202 and the connections to the following or preceding module 100, extrusion-coated cell connectors 230 require various cover shapes. Alternatively to the extrusion-coating of cell connectors 230, cell connectors 230 may also be clipped in during assembly, which requires only a single shape of the cover.

Two required seals on cover 135 may be sprayed on in a subsequent work step, or may be directly connected in an attached form with the aid of a two-component tool and a two-component injection-molding machine using transfer technique, while the cover is sprayed.

Cover caps 235, 240, which are plugged over cell connectors 230 after the contacting of cells 202, are used only for protection from being touched. They may be produced as an injection-molded part of polypropylene. In order to identify optically the plus and the minus connection, cover caps 240 may be identified by color. Cooling plate 120 shown in FIGS. 1 and 2 may be seen only as a place marker. For example, cooling plate 120 may also be omitted and the tempering may be implemented using media channels 205 integrated into half shells 110. The embodiment of the media guidance, in this context, is flexible (see FIGS. 5, 6, 7, 8).

Possible reinforcements may be inlays of already impregnated and consolidated web semifinished product having a thermoplastic matrix (organic sheet) or metallic inlays.

According to one specific embodiment of the present invention, a mentioned housing device 105 has an accommodation region for a cell 202 and a spacer element 150, further housing covers being omitted because of the modular construction of housing device 105. Moreover, housing device 105 includes elements 160 for cell contacting, which at the same time makes possible a certain reinforcement of a module and a connection of the single cells 202. In addition, housing device 105 is implemented using a cooling concept. The cooling concept includes lateral cooling channels 205, which are integrated into a half shell, and which include a plug connection 210 to a cooling plate 120. Because of a further integration into the half shell, cooling plate 120 may also be completely omitted.

Bracing of housing device 105 takes place, according to one exemplary embodiment, via a tie rod 155 passed through cutouts, the cutouts being able to be embodied similarly to spacers 150, or being embodied by spacers 150. Thus one may do without the bracing using additional ties.

In addition, the housing elements 110 mentioned are able to be produced in an injection-molding method as plastic components. Consequently, housing device 105 is able to be embodied in a light construction and a cost-effective manner. The housing device 105 mentioned further includes a configuration approach for contacting cells 202 as well as a degassing system.

Figure 5:
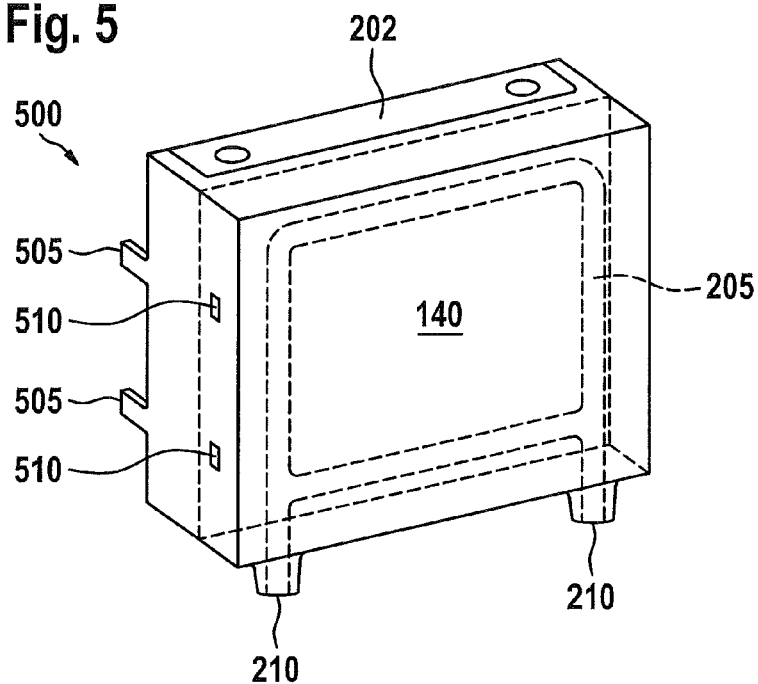
FIG. 5 shows a schematic representation of an housing device for at least one energy store cell according to an exemplary embodiment of the present invention.

FIG. 5 shows an housing device 500 according to an exemplary embodiment of the present invention. By contrast to the housing device shown in FIGS. 1, 2 and 4, cooling channel 205 is not integrated into a side wall but into back wall 140, which forms a cavity for accommodating cooling channel 205. In this instance, cooling channel 205 runs in the form of a 360-degree loop along an inner wall region of back wall 140. A lower side of back wall 140, in the area of side walls 145, is provided in each case with a simple connection as interface 210, one connection being used for supplying and an opposite, additional connection being used for removing the cooling fluid. The two connections are connected to each other via the circulation of cooling channel 205. Consequently, a back side of energy store cell 202 facing back wall 140 is able to be cooled using cooling fluid.

Furthermore, the exemplary embodiment shown in FIG. 5 includes two rectangular projections 505 situated one over the other instead of guide elements 150, that are also called latches. Projections 505 are developed on a side of side walls 145 facing away from back wall 140. On a side of side walls 145 facing back wall 140, two slot-shaped projection accommodations 510 are arranged one over the other for accommodating and latching in a further projection 505 of a further housing element (not shown), projection accommodations 510 and projections 505 being each situated in the same plane. Using projections 505 and projection accommodations 510, the housing element is able to be connected to the further housing element.

Figure 6:
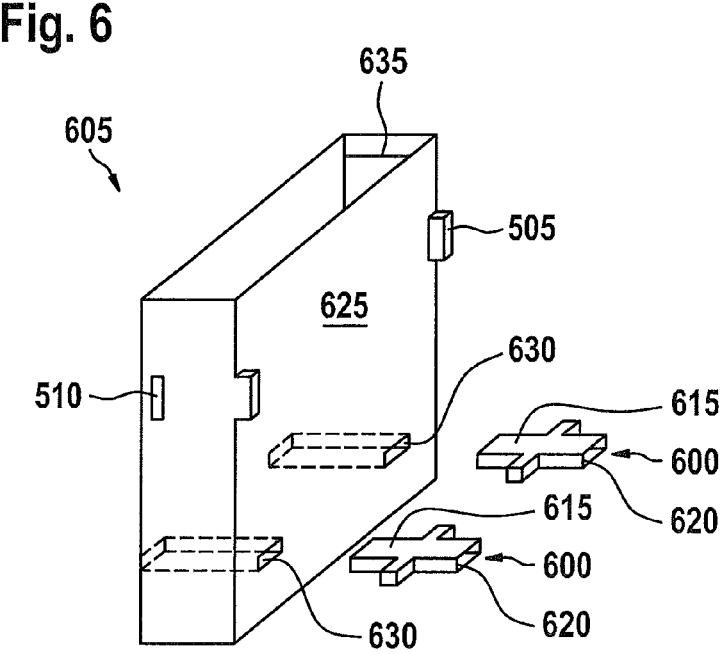
FIG. 6 shows a schematic representation of a connecting piece for an housing element for an energy store device according to an exemplary embodiment of the present invention.

FIG. 6 shows two connecting pieces 600, also known as plug connectors, for an housing element 605 for an energy store device according to an exemplary embodiment of the present invention. Connecting pieces 600 are situated outside housing element 605 in parallel to each other, and each embodied in the shape of a cross, in each case a first end being connected to a second end of connecting piece 600 that is opposite to the first end by a through hole channel 615 for passing through a fluid from the first to the second end. The fluid may be the cooling fluid, for example.

Moreover, the second end is developed to have an interface 620 in order to become connected in a fluid-tight manner to a further first end of a further connecting piece 600 (not shown).

By contrast to housing element 110 shown in FIGS. 2 and 4, the front side of housing element 605 is closed by a front wall 625 lying opposite to back wall 140. Furthermore, housing element 605 has projections 505 shown in FIG. 5 and projection accommodations 510. In an inner region of housing element 605 adjacent to floor wall 405, two housing connecting channels 630 are developed that are arranged parallel to each other, which each connect back wall 140 to front wall 625 for passing through the fluid. Housing element 605 is able to be connected in a fluid-tight manner to a further housing element 605 (not shown), the second end of connecting piece 600 being introduced into a first end of housing connecting channel 630 and the first end of connecting piece 600 being introduced into an additional second end of an additional housing connecting channel 630.

Furthermore, the one side wall 145 is provided, in an upper edge region, with a groove 635 for clipping a cover 810 (not shown) into housing element 605, the length of the groove corresponding the width of side wall 145.

Figure 7:
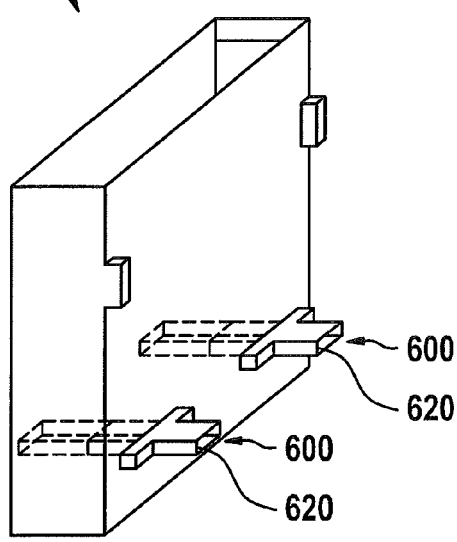
FIG. 7 shows a schematic representation of a connecting piece for an housing element for an energy store device according to an exemplary embodiment of the present invention.

FIG. 7 shows connecting piece 600, for housing element 605 for an energy store device according to an exemplary embodiment of the present invention. In contrast to FIG. 6, connecting piece 600 shown in FIG. 7 is integrated into housing element 605. The second end of housing connecting channel 630 is extended by the second end of connecting piece 600 as interface 620, the second end of connecting piece 600 extending out of housing element 605. Interface 620 is able to be connected fluid-tight to the further first end, for example, of additional connecting piece 600, which forms the further first end of additional housing connecting channel 630 (not shown).

Figure 8:
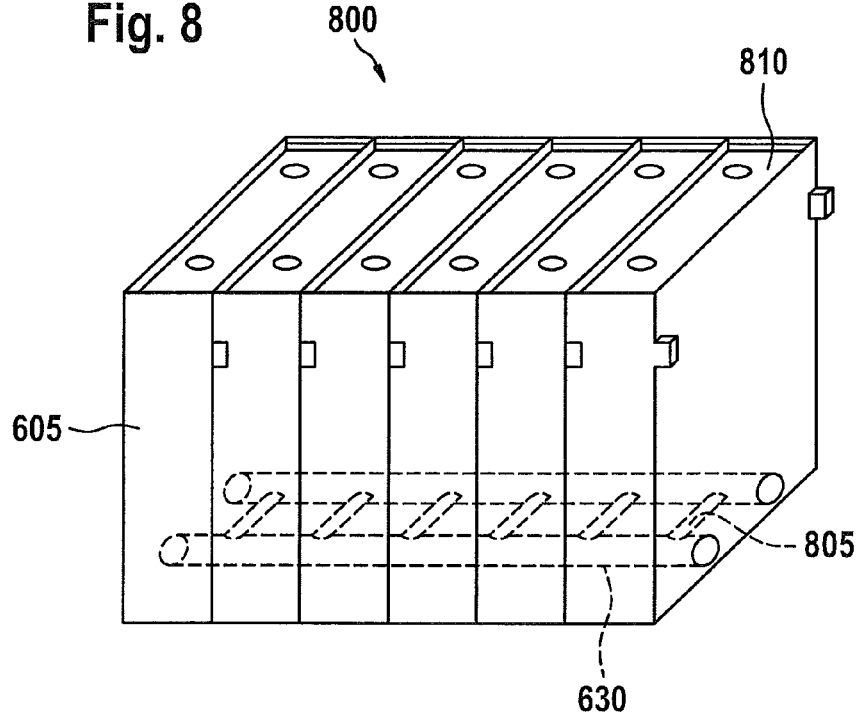
FIG. 8 shows a schematic illustration of an energy store device according to an exemplary embodiment of the present invention.

FIG. 8 shows energy store device 800 according to one exemplary embodiment of the present invention. Energy store device 800 is formed by six housing elements 605 that are joined to one another using projections 505 and projection accommodations 510, the two housing connecting channels 630 forming two long channels, through which the fluid is able to be conveyed from a front side of energy store device 800 to a back side of energy store device 800 lying opposite to the front side. By contrast to FIGS. 6, 7, the two housing connecting channels 630 shown in FIG. 8 are short-circuited using a transverse channel 805 developed in housing element 605.

Moreover, housing element 605 is closed by cover 810, cover 810 having two opposite openings for the minus pole and the plus pole of the energy store cell enclosed by housing element 605.

Figure 9:
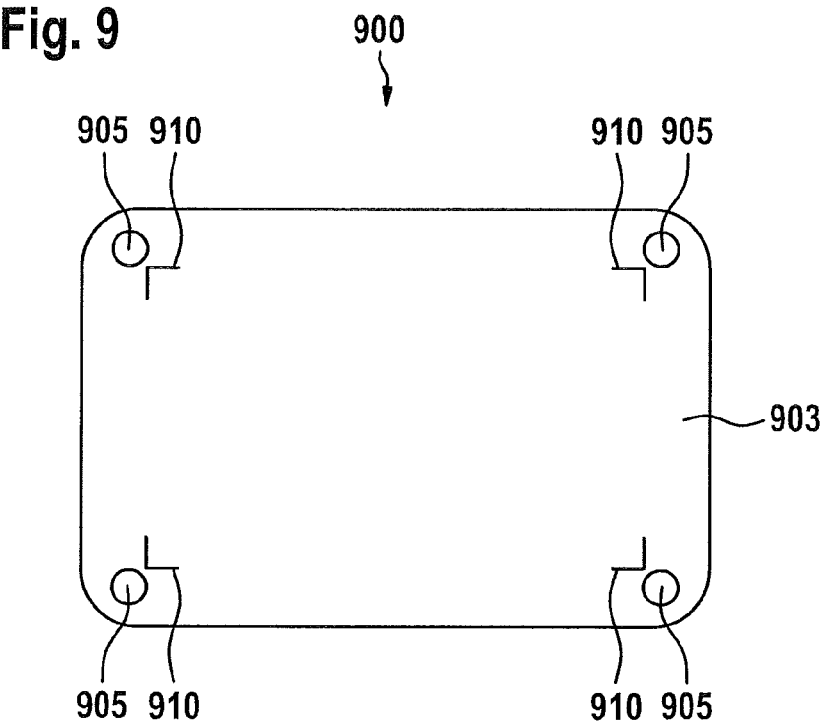
FIG. 9 shows a schematic representation of an housing device for at least one energy store cell according to an exemplary embodiment of the present invention.

FIG. 9 shows an housing device 900 for the at least one energy store cell according to an exemplary embodiment of the present invention. Housing device 900, also called a member for the bracing and the electrical insulation of the energy store cells, is made up of an housing element 903 which is implemented in the form of a rectangular separating disk, which may be made of plastic and having rounded corners. In an edge region of the corners, there is developed in each case an opening 905 situated on a diagonal of housing element 905, for passing through connecting element 155.

Adjacent to opening 905 there is a right angled angular element 910, also called a rib, for cell fixing on the diagonal, the apex of angular element 910 facing opening 905. The four angular elements 910 are developed in order to fix energy store cell 202 in a specified position.

Using housing device 900, energy store cell 202 is able to be electrically insulated from a further energy store cell 202 (not shown) and braced in a stable manner.

Figure 10:
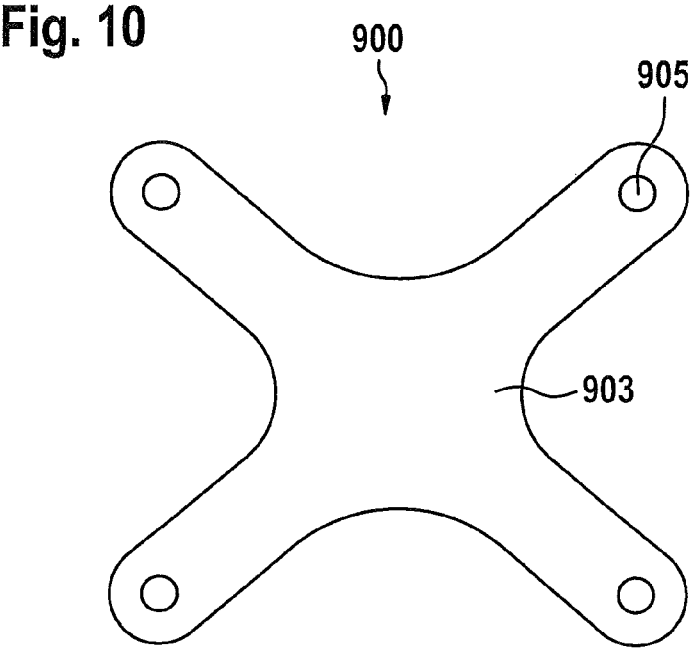
FIG. 10 shows a schematic representation of an housing device for at least one energy store cell according to an exemplary embodiment of the present invention.

FIG. 10 shows an housing device 900 for the at least one energy store cell 202 (not shown) according to an exemplary embodiment of the present invention. By contrast to FIG. 9, housing device 900 shown in FIG. 10 is embodied in the form of a separating cross. The separating cross is formed by cutting out an edge region lying between the corners of housing element 903, whereupon the width of the cut out region to the center of housing element 903 is reduced. Consequently, the weight of housing element 903 is able to be reduced.

Figure 11:
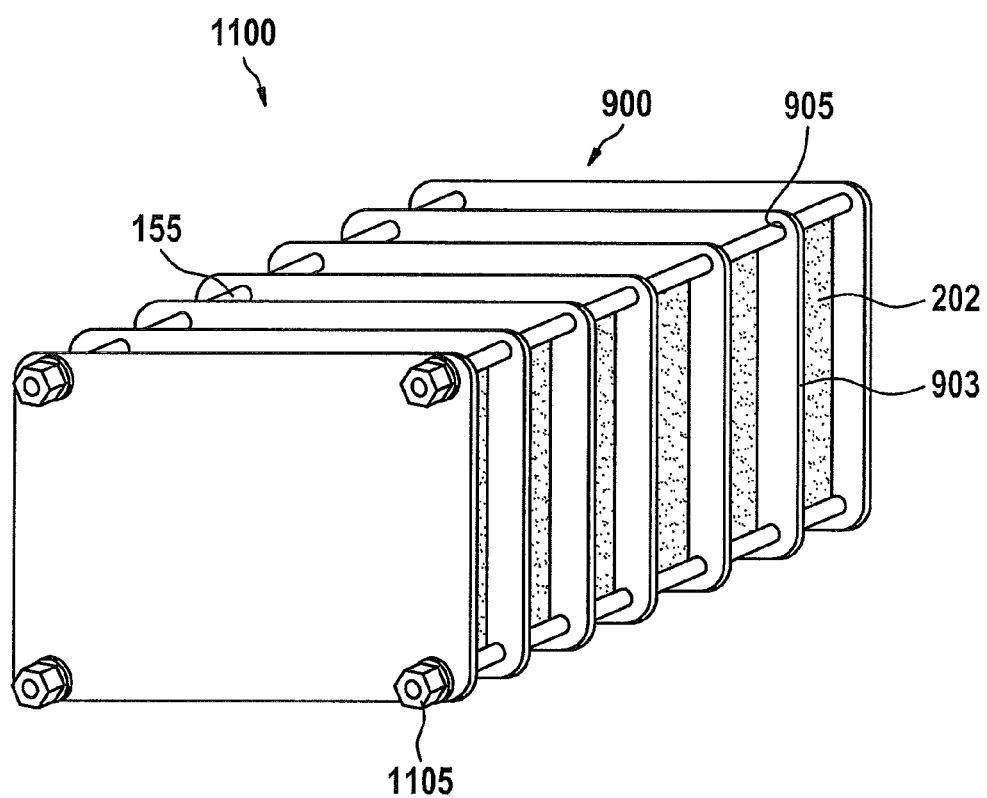
FIG. 11 shows a schematic representation of an energy store device for at least one energy store cell according to an exemplary embodiment of the present invention.

FIG. 11 shows an housing device 1100 for the at least one energy store cell 202 according to an exemplary embodiment of the present invention. Energy store device 1100 is made up of housing device 900 having seven housing elements 903 according to the exemplary embodiment shown in FIG. 9. Between housing elements 903, there is in each case fixed an energy store cell 202 using angular elements 910, so that energy store device 1100 has a total of six energy store cells 202. Through openings 905, connecting element 155 mentioned, in this case a connecting rod embodied as a tie rod, is guided in each case, and screwed together firmly with a nut 1105 with housing device 903, thus bracing the latter.

According to a further exemplary embodiment, energy store device 1100 may be provided with an housing, for example.

In the following text, the configuration of an exemplary embodiment of housing device 900 shown in FIGS. 9, 10, 11 will be described.

Housing device 900 has various geometries for components made of plastic, using which prismatic lithium ion cells 202 are able to be braced in a module 1100, with the aid of tie rods 155 or similar metallic components. These plastic components at the same time prevent direct contact of the metallic cell cans, so that a lacquering process and a pasting-on process may be completely omitted. Because of this, strict safety and environmental regulations for the lacquering process become irrelevant. In addition, material and production costs may be reduced, and the cells may be braced specifiably.

FIG. 11 shows the bracing of several lithium ion cells 202 using separating plates 903 of plastic and tie rods 155. Sprayed-on ribs 910 enable a fixing of cells 202 during assembly, or rather before bracing via tie rods 155. Because each cell 202 is completely surrounded by a plastic half shell 903, a lacquering process for insulating cells 202 is able to be omitted.

According to one specific embodiment, separating disk 903 may be embodied like an housing device mentioned, as a plastic-plastic hybrid component.

For a further weight and material reduction, separating disks 903 may also be embodied in a cruciform manner, as shown in FIG. 10.

According to one specific embodiment, an housing device mentioned has housing elements in the form of plates of crosses, which are developed to accommodate, brace and insulate from one another particularly prismatic cells. The bracing of the housing elements may take place especially using tie rods.

The housing device mentioned may be situated in an additional housing, and is suitable as supplementation to an half shell concept mentioned.

The exemplary embodiments described and shown in the figures have been selected merely as examples. Different exemplary embodiments are combinable with one another, either completely or with regard to individual features. An exemplary embodiment may also be supplemented by features from another exemplary embodiment.

Furthermore, method steps according to the present invention may be carried out repeatedly and also performed in a sequence other than the one described.

If an exemplary embodiment includes an "and/or" linkage between a first feature and a second feature, this may be understood to mean that the exemplary embodiment according to one specific embodiment has both the first feature and the second feature, and according to an additional specific embodiment, either has only the first feature or only the second feature.

What is claimed is:

1. A housing device, comprising:
   a first housing element for accommodating a first energy store cell, the first housing element having a back wall and two side walls lying opposite to each other, the back wall extending in a first direction from a first one of the two side walls to a second one of the two side walls;
a cooling plate below the first housing element; and
at least one plug terminal;
wherein:
   a front side of the first housing element, which lies opposite the back wall in a second direction that is perpendicular to the first direction, is open, and is closable by a back wall of a second housing element;
   the at least one plug terminal extends, in a third direction that is perpendicular to each of the first and second directions, from a bottom of the first one of the side walls and into at least one corresponding depression in the cooling plate;
   the first one of the side walls includes at least one channel at least a part of which extends longitudinally in the third direction towards the at least one plug terminal, the at least one plug terminal providing a fluidic connection between the at least one channel and the cooling plate; and
   at least one of the following:
      (a) each respective one of the at least one channel terminates with a terminal end of the respective channel at an upper edge of the first one of the side walls, so that the respective channel extends away from a respective one of the at least one plug terminal to the respective terminal end of the respective channel without any continued extension away from the respective plug terminal beyond the respective terminal end;
      (b) the longitudinal extension of the at least one channel occurs in a region of the first one of the side walls that is between the back wall of the first housing element and the front side, and an upper side of the first housing element that is opposite the cooling plate is, excluding any covering separate from the first housing element, open, so that, in a plane (1) that is parallel to the back wall of the first housing element and (2) in which the longitudinal extension of the at least one channel occurs, top edges of the side walls are not connected to each other by any extension of the first housing element from the top edge of the first one of the side walls to the top edge of the second one of the two side walls; and
      (c) the second one of the side walls does not include any part of the at least one channel.

2. The housing device of claim 1, wherein the first housing element includes a guide element, the guide element including a feed-through opening through which a connecting element is insertable in the second direction.

3. The housing device of claim 2, further comprising:
   the connecting element which is guided through the feed-through opening so as to brace the first and second housing elements.

4. The housing device of claim 1, wherein the first housing element is made of plastic.

5. The housing device of claim 1, wherein the at least one channel is configured for guiding a cooling fluid through the housing element, for cooling the first energy store cell.

6. The housing device of claim 1, wherein the first housing element has a bottom wall which closes a lower side of the first housing element, and wherein an upper side of the first housing element lying opposite the bottom wall is open and is closable by a first cover element.

7. The housing device of claim 6, wherein the first cover element closes the upper side of the first housing element.

8. The housing device of claim 6, wherein the first cover element is connectable to a second cover element that is configured to close an upper side of the second housing element.

9. The housing device of claim 1, further comprising:
   the second housing element for accommodating a second energy store cell, the second housing element having the back wall of the second housing element and also including two side walls lying opposite to each other, wherein:
      a front side of the second housing element, lying opposite the back wall of the second housing element, is open; and
      the front side of the first housing element is closed by the back wall of the second housing element.

10. The housing device of claim 9, further comprising:
    an end plate for closing the front side of the second housing element, wherein:
       each of the first and second housing elements includes a respective guide element, each of the guide elements including a feed-through opening through which a connecting element is insertable in the second direction; and
       the end plate has an end plate opening for guiding the connecting element through towards the feed-through openings of the respective guide elements of the first and second housing elements.

11. The housing device of claim 1, wherein the at least one plug terminal includes two plug terminals and the at least one channel includes two channels that extend in parallel in the first one of the side walls and towards respective ones of the two plug terminals.

12. The housing device of claim 1, wherein each of the at least one channel terminates with the terminal end of the respective channel at the upper edge of the first one of the side walls, so that the respective channel extends away from the respective one of the at least one plug terminal to the respective terminal end of the respective channel without any continued extension away from the respective plug terminal beyond the respective terminal end.

13. The housing device of claim 1, wherein the longitudinal extension of the at least one channel occurs in a region of the first one of the side walls that is between the back wall of the first housing element and the front side, and an upper side of the first housing element that is opposite the cooling plate , excluding any covering separate from the first housing element, open, so that, in the plane (1) that is parallel to the back wall of the first housing element and (2) in which the longitudinal extension of the at least one channel occurs, top edges of the side walls are not connected to each other by any extension of the first housing element from the top edge of the first one of the side walls to the top edge of the second one of the two side walls.

14. The housing device of claim 1, wherein the second one of the side walls does not include any part of the at least one channel.

15. An energy store device, comprising:
    a first energy store cell;
    a housing device including:
       a first housing element accommodating the first energy store cell, the first housing element having a back wall and two side walls lying opposite to each other, the back wall extending in a first direction from a first one of the two side walls to a second one of the two side walls;

a cooling plate below the first housing element; and
at least one plug terminal;
wherein:
   a front side of the first housing element, which lies opposite the back wall in a second direction that is perpendicular to the first direction, is open, and is closable by a back wall of a second housing element; and
   the at least one plug terminal extends, in a third direction that is perpendicular to each of the first and second directions, from a bottom of the first one of the side walls and into at least one corresponding depression in the cooling plate;
   the first one of the side walls includes at least one channel at least a part of which extends longitudinally in the third direction towards the at least one plug terminal, the at least one plug terminal providing a fluidic connection between the at least one channel and the cooling plate; and
   at least one of the following:
      (a) each respective one of the at least one channel terminates with a terminal end of the respective channel at an upper edge of the first one of the side walls, so that the respective channel extends away from a respective one of the at least one plug terminal to the respective terminal end of the respective channel without any continued extension away from the respective plug terminal beyond the respective terminal end;
      (b) the longitudinal extension of the at least one channel occurs in a region of the first one of the side walls that is between the back wall of the first housing element and the front side, and an upper side of the first housing element that is opposite the cooling plate is, excluding any covering separate from the first housing element, open, so that, in a plane (1) that is parallel to the back wall of the first housing element and (2) in which the longitudinal extension of the at least one channel occurs, top edges of the side walls are not connected to each other by any extension of the first housing element from the top edge of the first one of the side walls to the top edge of the second one of the two side walls; and
      (c) the second one of the side walls does not include any part of the at least one channel.

16. A housing device comprising:
a first housing element for accommodating a first energy store cell;
a second housing element for accommodating a second energy store cell;
at least one first plug terminal;
at least one second plug terminal; and
a cooling plate below the first and second housing elements, wherein:
   the first housing element includes a first back wall and a first set of two side walls lying opposite each other, the first back wall extending in a first direction from a first one of the two side walls of the first set to a second one of the two side walls of the first set;
   the second housing element includes a second back wall and a second set of two side walls lying opposite to each other, the second back wall extending in the first direction from one of the two side walls of the second set to the other of the two side walls of the second set;
   a front side of the first housing element, which lies opposite the first back wall in a second direction that is perpendicular to the first direction, is closed by the second back wall;
   the at least one first plug terminal extends, in a third direction that is perpendicular to each of the first and second directions, from a bottom of the first one of the two side walls of the first set and into at least one first corresponding depression in the cooling plate;
   the first one of the two side walls of the first set includes at least one first channel at least a part of which extends longitudinally in the third direction towards the at least one first plug terminal, the at least one first plug terminal providing a fluidic connection between the at least one first channel and the cooling plate;
   the at least one second plug terminal extends, in the third direction, from a bottom of a first one of the two side walls of the second set and into at least one second corresponding depression in the cooling plate;
   the first one of the two side walls of the second set includes at least one second channel at least a part of which extends longitudinally in the third direction towards the at least one second plug terminal, the at least one second plug terminal providing a fluidic connection between the at least one second channel and the cooling plate; and
   at least one of the following:
      (a) each respective one of the at least one first channel terminates with a terminal end of the respective channel at an upper edge of the first one of the two side walls of the first set, so that the respective channel extends away from a respective one of the at least one plug terminal to the respective terminal end without any continued extension away from the respective plug terminal beyond the respective terminal end;
      (b) the longitudinal extension of the at least one first channel occurs in a region of the first one of the two side walls of the first set that is between the first back wall and the front side of the first housing element, and an upper side of the first housing element that is opposite the cooling plate is, excluding any covering separate from the first housing element, open, so that, in a plane (1) that is parallel to the first back wall and (2) in which the longitudinal extension of the at least one first channel occurs, top edges of the two side walls of the first set are not connected to each other by any extension of the first housing element from the top edge of the first one of the side walls of the first housing element to the top edge of the second one of the two side walls of the first housing element; and
      (c) the second one of the two side walls of the first set does not include any part of the at least one first channel.

\* \* \* \* \*

UNITED STATES PATENT AND TRADEMARK OFFICE
CERTIFICATE OF CORRECTION

PATENT NO. : 9,991,573 B2
APPLICATION NO. : 14/299393
DATED : June 5, 2018
INVENTOR(S) : Jens Ackermann and Veronika Vogel It is certified that error appears in the above-identified patent and that said Letters Patent is hereby corrected as shown below:

On the Title Page

In Column 1, item (54) in Title:
Change the title "HOUSING DEVICE FOR AT LEAST ONE ENERGY STORE CELL AND METHOD FOR PRODUCING AN HOUSING DEVICE FOR AT LEAST ONE ENERGY STORE CELL" to --HOUSING DEVICE FOR AT LEAST ONE ENERGY STORE CELL AND METHOD FOR PRODUCING A HOUSING DEVICE FOR AT LEAST ONE ENERGY STORE CELL--

In Column 1, item (30) in Foreign Application Priority Data:
Change the foreign priority number "10 2013 210 585" to --10 2013 210 585.1--.

Signed and Sealed this
Ninth Day of October, 2018

Andrei Iancu
*Director of the United States Patent and Trademark Office*